(12) United States Patent
Cáliz et al.

(10) Patent No.: US 9,083,213 B1
(45) Date of Patent: Jul. 14, 2015

(54) MICROGENERATOR FOR HYDROCARBON PRODUCING SYSTEMS

(71) Applicant: Intevep, S.A., Caracas (VE)

(72) Inventors: Nestor Cáliz, Los Teques Estado Miranda (VE); Alexander Fuenmayor, Estado Miranda (VE); Oswaldo Rivas, Estado Miranda (VE); Alí Hernández, Estado Miranda (VE); José Romero, Estado Miranda (VE)

(73) Assignee: Intevep, S.A., Caracas (VE)

( * ) Notice: Subject to any disclaimer, the term of this patent is extended or adjusted under 35 U.S.C. 154(b) by 7 days.

(21) Appl. No.: 14/150,811

(22) Filed: Jan. 9, 2014

(51) Int. Cl.
*F03B 13/00* (2006.01)
*H02K 7/18* (2006.01)

(52) U.S. Cl.
CPC .................... *H02K 7/1823* (2013.01)

(58) Field of Classification Search
CPC ........................................ F03B 13/00
USPC ............................................. 290/54
See application file for complete search history.

(56) References Cited

U.S. PATENT DOCUMENTS

| | | | | |
|---|---|---|---|---|
| 305,575 | A * | 9/1884 | Culver | 415/188 |
| 2,060,414 | A * | 11/1936 | Fladeland | 415/69 |
| 2,794,129 | A | 5/1957 | Palmenberg et al. | |
| 4,654,537 | A * | 3/1987 | Gaspard | 290/54 |
| 4,809,510 | A | 3/1989 | Gaspard et al. | |
| 5,839,508 | A * | 11/1998 | Tubel et al. | 166/65.1 |
| 6,531,795 | B2 | 3/2003 | Weimer | |
| 6,672,409 | B1 | 1/2004 | Dock et al. | |
| 6,848,503 | B2 * | 2/2005 | Schultz et al. | 166/66.5 |
| 6,998,724 | B2 * | 2/2006 | Johansen et al. | 290/1 R |
| 7,382,061 | B2 | 6/2008 | Ferraro | |
| 7,579,703 | B2 * | 8/2009 | Shifrin | 290/52 |
| 2009/0001731 | A1 | 1/2009 | Perlo et al. | |
| 2014/0044543 | A1 * | 2/2014 | Jokela | 416/128 |

* cited by examiner

*Primary Examiner* — Joseph Waks
(74) *Attorney, Agent, or Firm* — Bachman & LaPointe, PC

(57) ABSTRACT

A microgenerator for use in petroleum distribution systems includes a casing defining an interior portion and an exterior portion. The casing has an opposed first support wall and second support wall coupled within an inner diameter of a cylinder containment wall. At least one fluid inlet penetrates the cylinder containment wall. The fluid inlet is fluidly coupled to an energized fluid source. At least one nozzle is fluidly coupled to the fluid inlet. The nozzle is configured to accelerate the fluid into the interior portion. At least one fluid outlet penetrates the cylinder containment wall. The fluid outlet is configured to discharge the fluid from said interior portion of the casing. An impulse turbine is located within the interior portion. The turbine has a first stator coupled to the first support wall and a second stator coupled to the second support wall opposite the first stator. A rotor is rotatably mounted between the first stator and the second stator on a shaft at a central axis of the rotor. The rotor includes an array of turbine blades integral to the rotor at an outer perimeter of the rotor. The nozzle is aligned to direct the fluid against the array of turbine blades to rotate the rotor about the central axis. A set of permanent magnets are fixed into the rotor proximate the turbine blades between the perimeter and the shaft. At least one electromagnetic core and coil assembly is fixed into the first stator arranged in a periphery about the central axis and is electromagnetically coupled to the set of permanent magnets and is configured to generate an electric current in cooperation with the set of permanent magnets.

8 Claims, 2 Drawing Sheets

MICROGENERATOR FOR HYDROCARBON PRODUCING SYSTEMS

BACKGROUND OF THE INVENTION

This disclosure relates to an apparatus for generating electrical power by harnessing the energy of flowing fluids in pipeline systems that deliver hydrocarbons and other fluids to and from wells.

Petroleum wells utilize a variety of electronic equipment to monitor, control and process the hydrocarbons extracted from the wells. The electronic equipment requires a reliable, durable source of electrical power in order to operate. The electrical power needed for the electronic equipment in remote locations is typically supplied from power systems having photovoltaic cells with batteries. These photovoltaic cell power systems are required to be located exterior to the pipeline and are easily accessed. The photovoltaic cell power systems are also desirable for use on many non-hydrocarbon system applications. As a result, the photovoltaic cell power systems are targeted to be stolen and used elsewhere.

What is needed is a clean reliable source of electrical power for remotely located hydrocarbon production and delivery electronic equipment that is an alternative to the photovoltaic cell power systems.

SUMMARY OF THE INVENTION

One aspect of the disclosure involves a microgenerator for use in hydrocarbon distribution systems comprising a casing defining an interior portion and an exterior portion. The casing has an opposed first support wall and second support wall coupled within an inner diameter of a cylinder containment wall. At least one fluid inlet penetrates the cylinder containment wall. The fluid inlet is fluidly coupled to an energized fluid source. The energized fluid source is selected from the group consisting of a pressurized hydrocarbon, injection fluid, pneumatic control fluid, lift gas, steam, or petroleum liquid gas mixture. At least one nozzle is fluidly coupled to the fluid inlet. The nozzle is configured to accelerate the fluid into the interior portion. At least one fluid outlet penetrates the cylinder containment wall. The fluid outlet is configured to discharge the fluid from said interior portion of the casing. An impulse turbine is located within the interior portion. The turbine has a first stator coupled to the first support wall and a second stator coupled to the second support wall opposite the first stator. A rotor is rotatably mounted between the first stator and the second stator on a shaft at a central axis of the rotor. The rotor includes an array of turbine blades integral to the rotor at an outer perimeter of the rotor. The nozzle is aligned to direct the fluid against the array of turbine blades to rotate the rotor about the central axis. A set of permanent magnets are fixed into the rotor proximate the turbine blades between the perimeter and the shaft. At least one electromagnetic core and coil assembly is fixed into the first stator arranged in a periphery about the central axis and is electromagnetically coupled to the set of permanent magnets and is configured to generate an electric current in cooperation with the set of permanent magnets.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
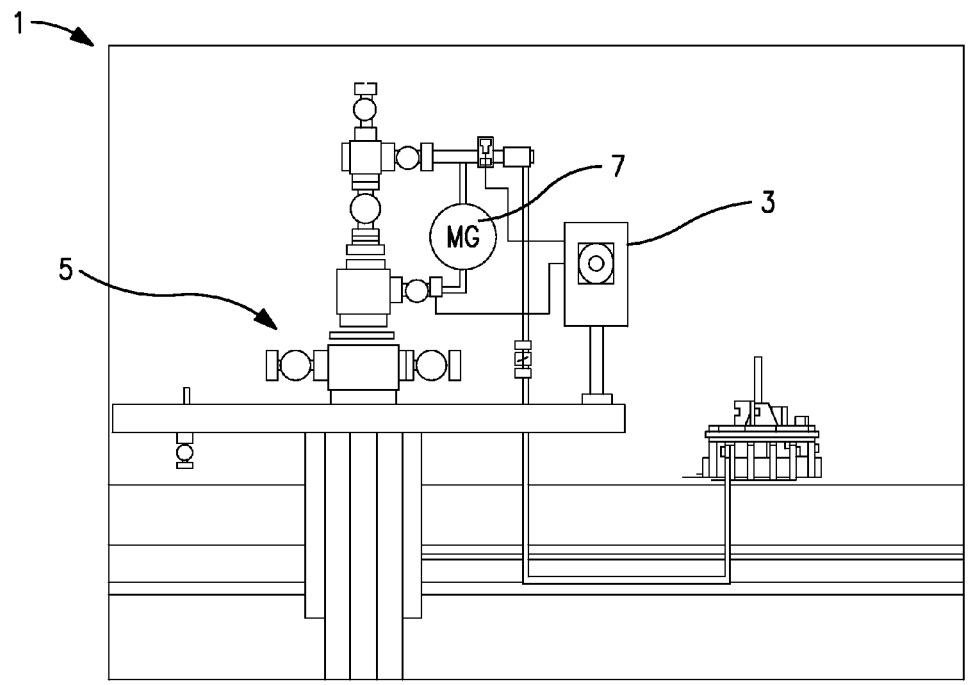
FIG. 1 is a diagram of a petroleum distribution system.

As shown in FIG. 1 a diagram of a hydrocarbon (petroleum) distribution system 1 is shown. The hydrocarbon distribution system 1 includes workflow station 3 coupled to a wellhead 5. The workflow station 3 functions to control and operate the various fluid flow components that are integrated into the wellhead 5. The workflow station 3 also includes telemetry equipment and microprocessor controllers that function to process the fluids in the hydrocarbon distribution system 1. The workstation 3 components require electrical power to operate. A microgenerator 7 is coupled to the workstation 3 and provides electrical power to the workstation 3. The microgenerator 7 is fluidly coupled to the hydrocarbon distribution system 1. The fluid flow energy of the fluids flowing in the hydrocarbon distribution system 1 is at least one source of energy the microgenerator 7 can utilize to convert mechanical energy into electrical energy to be supplied to the electrical load in the hydrocarbon distribution system 1. The microgenerator 7 can be utilized to provide electrical energy to a variety of equipment (not shown) including but not limited to, heaters, pumps, telemetry equipment, valve actuators, controllers, power packs, navigation equipment, lights, and the like. In an alternative embodiment, the microgenerator 7 can be fluidly coupled to other energized fluid systems, such as, injection fluids, waste gas, carbon dioxide injection fluids and the like.

Figure 2:
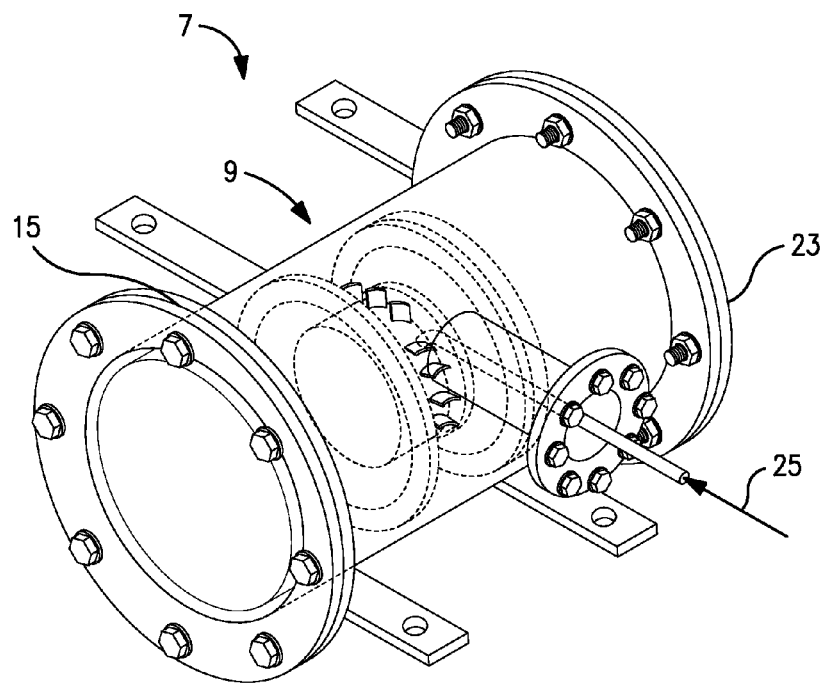
FIG. 2 is an isometric view of the microgenerator.
Figure 3:
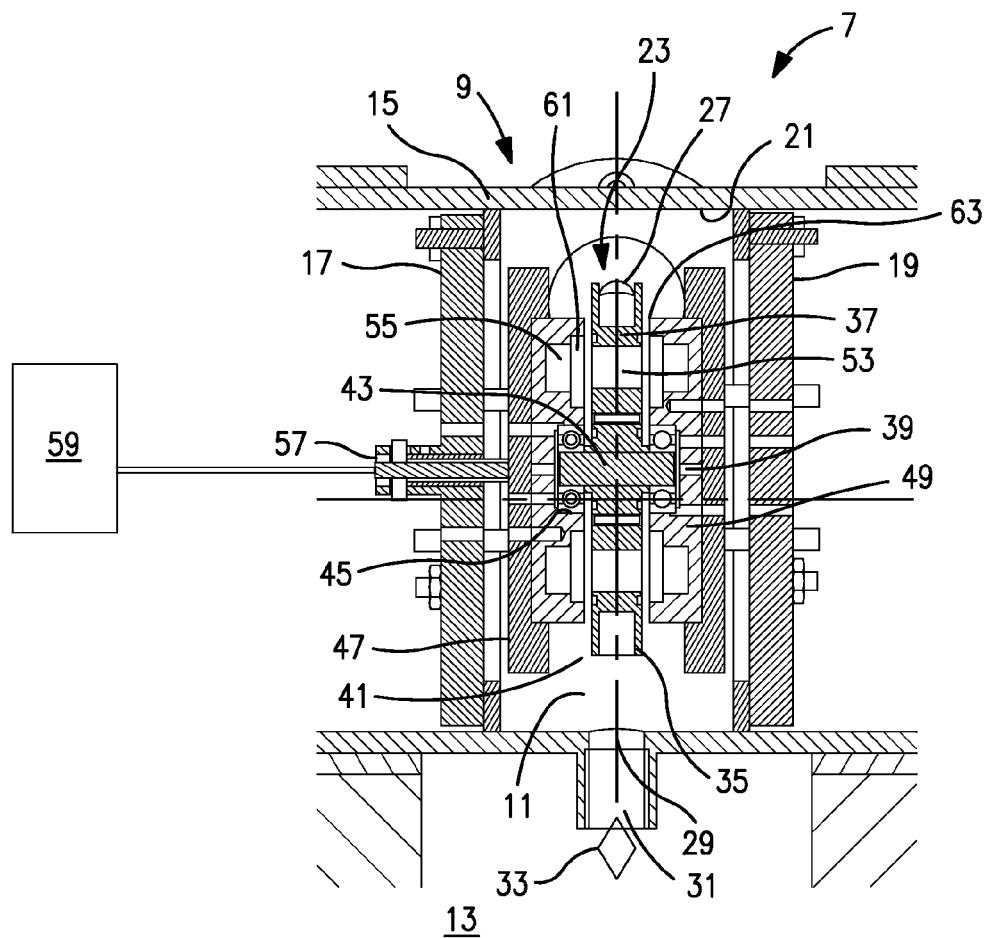
FIG. 3 is a section view of the microgenerator.

Referring now to FIGS. 2 and 3, an isometric view and a section view of the microgenerator 7, respectively, are provided. The microgenerator 7 can include a casing 9. The casing 9 can be constructed from pipe section of an appropriate dimension. Of course other suitable materials of construction can be used. The casing 9 can include an interior portion 11 and exterior portion 13 defined by a cylinder containment wall 15 and a first support wall 17 and second support wall 19. The first support wall 17 is coupled to an inside diameter 21 of the cylinder containment wall 15 opposite to the second support wall 19. Each support wall 17, 19 span the inner cross section of the cylinder containment wall 15 to form the fluid tight interior portion 11.

A fluid inlet 23 penetrates the cylinder containment wall 15. In an alternative embodiment, multiple fluid inlets 23 are arranged about the perimeter of the cylinder containment wall 15. The fluid inlet 23 is fluidly coupled to a fluid source 25. The fluid source 25 is energized. The fluid source 25 includes a pressure P1. The fluid source 25 can be a pressurized hydrocarbon. The fluid source 25 can include liquid phase fluid, gas phase fluid, solids, and mixed phase fluids, such as gases and liquids with particles. The fluid source 25 can include materials from the hydrocarbon production system 1, including petroleum and other materials common to such production systems. The fluid source 25 can include other energized fluid system, such as, pressurized petroleum fluids, injection fluids, waste gas, steam, carbon dioxide injection fluids, pneumatic control fluid, gas from a gas lift system, fluid bypass from an oil well systems such as the wellhead 5, oil well or the like, oil/gas mixtures and the like. The fluid source 25 can be proximate the well head 5.

The fluid inlet 23 includes a nozzle 27. The nozzle 27 is configured to accelerate the materials flowing through the fluid inlet. In alternative embodiment, multiple nozzles 27 can be configured with the fluid inlet 23. The nozzle 27 directs the flow of fluid into the interior portion of the casing 9.

A fluid outlet 29 penetrates the cylinder containment wall 15. The fluid outlet 29 is configured to discharge the materials from the interior portion 11 to the exterior portion 13. The fluid outlet 29 can be configured along the perimeter of the cylinder containment wall 15 at a location that optimizes discharge of the materials. The fluid outlet 29 can be coupled to a fluid discharge 31. The fluid discharge 31 includes a pressure P2 that is less than the fluid source 25 pressure P1. In another embodiment, an ejector 33 can be fluidly coupled to the fluid outlet 29 to enable removal of the materials from the interior portion 11. The ejector 33 can be coupled to an energized fluid that provides the pumping energy to create a suction at the fluid outlet 29. In some applications, certain materials from the fluid source 25 may not be easily discharged from the interior portion, such as condensed liquids, sludge, entrained solids, low viscosity fluids and the like. These materials may cause fouling at the interior portion 11. By adaptation of larger pressure differentials between P1 and P2 and/or the use of an ejector 33 or other pumping device, the material discharge can be enhanced and potential fouling can be reduced.

A turbine 35 is mounted in the interior portion 11 between the first support wall 17 and second support wall 19. The turbine 35 can be configured as an impulse turbine. The turbine 35 includes a rotor 37. The rotor 37 is configured as a circular disc with a central axis 39 located at the center of the circular disc and a perimeter 41. The rotor 37 is coupled to a shaft 43 aligned through the central axis 39. The shaft 43 allows for free rotary motion of the rotor 37 about the central axis 39. The shaft 43 is supported by bearings 45 mounted to a first stator 47 and a second stator 49 opposite the first stator 47. The rotor 37 includes an array of turbine blades 51 at the perimeter 41 of the rotor 37. The blades 51 are configured to impart mechanical energy to the rotor 37 received from the materials flowing from the nozzle 27. The blades 51 can be formed integral to the rotor 37. The blades 51 can be affixed to the rotor 37 by couplings or other attachment means. The materials exiting the nozzle 27 are directed by the nozzle 27 to impact the blades 51 and create rotary motion in the rotor 37. The turbine 35 is a free turbine and configured to rotate, preferably freely rotate, in the absence of any mechanical rotary output. The nozzle 27 can be aligned to direct the discharge of the nozzle 27 to the blades 51 transverse to the central axis 39. Permanent magnets 53 are fixed to the rotor between the perimeter 41 and central axis 39. The permanent magnets 53 comprise a material that maintains a magnetic field.

The first stator 47 is coupled to the first support wall 17 and the second stator 49 is coupled to the second support wall 19. An electromagnetic core and coil assembly 55 is fixed to the first stator 47 and second stator 49. The electromagnetic core and coil assembly 55 is electromagnetically coupled to the permanent magnets 53. The electromagnetic core and coil assembly 55 is configured to generate an electric current in cooperation with the permanent magnets 53 of the rotor 37 when the rotor 37 rotates. The rotation of the rotor 37 with the permanent magnets 53 induces an alternating current in the coils 61 to generate the electricity. The core can comprise a spiral core of laminated ferromagnetic material inserted into each of the first stator 47 and second stator 49. The coil 61 can be placed on the core. The coils 61 can be constructed integral to the core or independently. The coils 61 can be electrically coupled in series or in parallel. The first stator 47 and second stator 49 can include a cover 63 formed of an epoxy resin or similar material to protect the core and coil assembly 55. The first stator 47 and second stator 49 include mounts for the bearings 45 and support the shaft 43 and rotor 37. The bearings 45 are mounted at the interior portion 11. An electrical conduit 57 is disposed through the first support wall 17 and is configured to conduct electrical current from the generation components in the interior portion 11 to the exterior portion 13 and ultimately to the electrical load 59. Conduit 57 could alternatively be disposed through second support wall 19, or both walls, as disclosed. The electricity generated by the mircrogenerator 7 can include an alternating current selected from the group consisting of single phase alternating current, two phase alternating current and three phase alternating current.

The microgenerator 7 can operate at fixed speeds or in a variable speed configuration as needed. Speed can be varied by controlling the source pressure P1, discharge pressure P2 or a combination of the two, as well as by controlling the mass flow of the fluids. Pressure regulators, and flow controllers can accomplish this purpose.

The microgenerator 7 as embodied herein, provides the capacity to generate electrical power by converting the energy of the fluid source 25 into mechanical rotary energy and then into electrical energy in remote locations. The microgenerator 7 design allows for a compact design that is not as susceptible to theft as it is exclusively designed to operate next to the piping systems in use at the remote site. The microgenerator 7 is not dependent upon the sun or wind to provide electrical energy.

One or more embodiments have been described. Nevertheless, it will be understood that various modifications may be made. For example, in an alternative embodiment, a plurality of turbines 35 can be mechanically coupled along a common central axis 39 within the interior portion 11. Additional nozzles 27 can be fluidly coupled to each of the turbines 35 to produce mechanical rotary energy and convert the rotary energy into electrical energy with the electromagnetic core and coil assembly 55 and permanent magnet 53 sets. Accordingly, other embodiments are within the scope of the following claims.

What is claimed is:

1. A microgenerator for use in petroleum distribution systems comprising:
   a casing defining an interior portion and an exterior portion, said casing having opposed first support wall and second support wall coupled within an inner diameter of a cylinder containment wall;
   at least one fluid inlet penetrating said cylinder containment wall, said fluid inlet fluidly coupled to an energized fluid source; said energized fluid source selected from the group consisting of a pressurized hydrocarbon, injection fluid, pneumatic control fluid, gas from a gas lift system, steam, or petroleum liquid gas mixture;
   at least one nozzle fluidly coupled to said fluid inlet, said nozzle configured to accelerate said energized fluid into said interior portion;
   at least one fluid outlet penetrating said cylinder containment wall, said fluid outlet configured to discharge said petroleum fluid from said interior portion of said casing;
   an impulse turbine within said interior portion, said impulse turbine having a first stator coupled to said first support wall and a second stator coupled to said second support wall opposite said first stator, a rotor rotatably mounted between said first stator and said second stator on a shaft at a central axis of said rotor, said rotor including an array of turbine blades integral to said rotor at an outer perimeter of said rotor;
   said at least one nozzle aligned to direct said petroleum fluid against said array of turbine blades to rotate said rotor about said central axis;

a set of permanent magnets fixed into said rotor proximate said turbine blades between said perimeter and said shaft; and at least one electromagnetic core and coil assembly fixed into said first stator arranged in a periphery about said central axis and electromagnetically coupled to said set of permanent magnets configured to generate an electric current in cooperation with said set of permanent magnets.

2. The microgenerator of claim 1, further comprising:

an electrical conduit disposed through said first or second wall or both walls electrically coupled to said electromagnetic core configured to transmit electricity from said interior portion to said exterior portion.

3. The microgenerator of claim 1, wherein:

said at least one nozzle is aligned to direct said energized fluid against said array of turbine blades transverse to said central axis.

4. The microgenerator of claim 1, wherein:

said shaft is supported on bearings mounted to said first stator and said second stator within said interior.

5. The microgenerator of claim 1, wherein said shaft rotates freely in the absence of mechanical rotary output.

6. The microgenerator of claim 1, wherein said pressurized petroleum fluid source includes a fluid bypass from an oil well system.

7. The microgenerator of claim 1, wherein said electromagnetic core is configured to generate an alternating electric current selected from the group consisting of one phase alternating current, two phase alternating current and three phase alternating current.

8. The microgenerator of claim 1, comprising:

a plurality of said impulse turbines mechanically coupled along a common axis within said interior portion, a plurality of said nozzles fluidly coupled to each of said impulse turbines.

\* \* \* \* \*